(12) United States Patent
Lee

(10) Patent No.: US 7,338,089 B2
(45) Date of Patent: Mar. 4, 2008

(54) PIPE INTERRUPTION FITTING

(76) Inventor: Woo Kag Lee, 8 Dong 802 Ho, Daelim Apartment, 19, Ogum-Dong, Songpa-Gu, Seoul, 138-737 (KR)

( * ) Notice: Subject to any disclaimer, the term of this patent is extended or adjusted under 35 U.S.C. 154(b) by 0 days.

(21) Appl. No.: 11/489,768

(22) Filed: Jul. 20, 2006

(65) Prior Publication Data
US 2007/0018452 A1     Jan. 25, 2007

(30) Foreign Application Priority Data
Jul. 25, 2005    (KR)  ............... 20-2005-0021625 U

(51) Int. Cl.
    *F16L 41/00*      (2006.01)
    *F16L 55/10*      (2006.01)
    *F16K 43/00*      (2006.01)
    *B23B 41/08*      (2006.01)

(52) U.S. Cl. ............ 285/197; 137/317; 137/318; 137/15.09; 137/15.14

(58) Field of Classification Search ............ 285/126.1, 285/129.1, 197, 198, 199; 137/317, 318, 137/15.08, 15.09, 15.14
See application file for complete search history.

(56) References Cited

U.S. PATENT DOCUMENTS

| | | | |
|---|---|---|---|
| 534,881 A * | 2/1895 | Hearne et al. ............... 137/318 |
| 2,050,985 A * | 8/1936 | Trickey ................... 137/15.08 |
| 2,666,211 A * | 1/1954 | Schmid ...................... 4/252.6 |
| 3,867,964 A * | 2/1975 | Gardner ....................... 138/89 |
| 4,141,378 A * | 2/1979 | Wegner et al. ......... 137/315.29 |
| 5,368,339 A * | 11/1994 | Serot ....................... 285/125.1 |
| 5,374,087 A * | 12/1994 | Powers ....................... 285/197 |
| 5,924,436 A * | 7/1999 | Kitani et al. ............. 137/15.09 |
| 5,967,168 A * | 10/1999 | Kitani et al. ............. 137/15.12 |
| 6,068,019 A * | 5/2000 | Lee ............................. 137/318 |
| 6,276,878 B1 * | 8/2001 | Lee .............................. 408/67 |
| 6,286,542 B1 * | 9/2001 | Morain et al. .............. 137/317 |
| 7,007,980 B2 * | 3/2006 | Otsuga et al. .............. 285/197 |
| 2004/0112431 A1* | 6/2004 | Burlock et al. ............. 137/317 |
| 2006/0027266 A1* | 2/2006 | Kim et al. .................. 137/318 |

* cited by examiner

*Primary Examiner*—James M. Hewitt
(74) *Attorney, Agent, or Firm*—Robert W. Becker & Associates; Robert W. Becker

(57) ABSTRACT

A pipe interruption fitting having a flange is removable after pipe maintenance work has been completed. The fitting includes an upper reinforcing plate, an inner surface of which has a curvature corresponding to an outer surface of the pipe, and a vertical pipe welded to the upper reinforcing plate. The fitting further includes an adaptor welded to the vertical pipe. Bolt holes are formed in an upper surface of the adaptor. A through hole is formed through the adaptor. An annular groove is formed in an inner surface of the through hole. The flange is removably coupled to the adaptor. Coupling holes are formed in the flange for installation of a boring machine or a stopple machine. The fitting further includes a plug fitted into the through hole of the adaptor and having an expansion plate to be inserted into the annular groove. A cover is adapted to be inserted into the through hole of the adaptor and to be welded thereto.

2 Claims, 12 Drawing Sheets

PIPE INTERRUPTION FITTING

BACKGROUND OF THE INVENTION

1. Field of the Invention

The present invention relates generally to pipe interruption fittings which are used for temporarily interrupting fluid, such as gas, water and sewage, chemicals, etc., flowing towards concerned portions of pipes while maintenance work, such as replacement or repair of pipes or connection of branch pipes, is conducted at the concerned portions of the pipes and, more particularly, to a pipe interruption fitting, which has a structure such that, after a pipe has been interrupted and pipe maintenance or repair work has been completed, an unnecessary flange is removed from the fitting, so that the fitting and the periphery can be easily processed for heat insulation and corrosion resistance treatment, and, as well, even if excavation work is conducted adjacent to the pipe interruption fitting, because there is no flange that can be caught by an excavator, the pipe interruption fitting is prevented from being damaged by the excavator.

2. Description of the Related Art

Recently, city gas is supplied to most dwellings. Furthermore, most buildings and dwellings use city gas as fuel for heating. Therefore, in most cities or villages where people dwell, gas pipes for supplying city gas from city gas supply plants are laid in the ground like webs.

Furthermore, in most cities or villages, water supply and sewage pipes as well as gas pipes are installed in the ground. Around plants for manufacturing chemicals, pipes for carrying chemicals are installed in the ground.

When it is required to repair or replace such a pipe, such as a gas pipe, a water or sewage pipe or a chemical pipe, with a new one, or when it is required to connect a branch pipe to a main pipe, pipe interruption fittings are used for interrupting an upstream position and a downstream position of a concerned portion requiring maintenance work (hereinafter, referred as "maintenance requiring portion") of the pipe.

That is, the maintenance requiring portion of the pipe is interrupted at an upstream position thereof, and is also interrupted at a downstream position thereof to prevent gas, water or sewage from backflowing towards the maintenance requiring portion.

Furthermore, it may be required to continuously supply gas or water during pipe maintenance work in order to prevent users from being inconvenienced. In this case, a bypass pipe may be temporarily provided between the upstream position and the downstream position of the maintenance requiring portion of the main pipe to continuously supply fluid, such as gas or water.

A representative example of conventional pipe interruption fittings is shown in FIG. 1. As shown in FIG. 1, in a conventional pipe interruption fitting 3, a flange 2 is welded to an upper end of a vertical pipe 1, and a lower end of the vertical pipe 1 has a shape corresponding to the curvature of the pipe to be interrupted.

The process of interrupting the pipe using the conventional pipe interruption fitting 3 having the above-mentioned structure will be described herein below.

(1) As shown in FIG. 2, the vertical pipe 1 is welded to the pipe 4 after the lower end of the vertical pipe 1 is brought into contact with the pipe 4.

(2) After an intermediate cutout valve 5 is coupled to the upper end of the flange 2, a boring machine 6 is mounted on an upper end of the intermediate cutout valve 5.

(3) As shown in FIG. 3, the intermediate cutout valve 5 is opened, and a boring tip 6a of the boring machine 6 is moved to the pipe 4 and is rotated, thus boring a hole in the pipe 4.

(4) The boring tip 6a of the boring machine 6 and a cut part of the pipe 4 are pulled up into the main body of the boring machine 6. Here, a device, which pulls the boring tip 6a and the cut part of the pipe 4 upwards, is provided in the boring machine 6, but this is not related to the present invention, therefore further explanation thereof will be omitted.

(5) The intermediate cutout valve 5 is closed, and the boring machine 6 is removed from the intermediate cutout valve 5.

(6) As shown in FIG. 4, a stopple machine 7 is mounted to the intermediate cutout valve 5.

(7) The intermediate cutout valve 5 is again opened, and a stopple 7a of the stopple machine 7 is moved downwards into the pipe 4 such that the stopple 7a interrupts fluid in the pipe 4. The stopple machine 7 has a structure such that the stopple 7a is perpendicularly bent after being inserted into the pipe 4, but this is a well known technique, therefore further explanation is deemed unnecessary.

(8) As such, in the state in which the pipe 4 is interrupted at each of the upstream and downstream positions of the maintenance requiring portion of the pipe 4 using the stopple 7a, maintenance work is conducted. After the maintenance work has been completed, the stopple 7a of the stopple machine 7 is pulled up into the main body of the stopple machine 7, the intermediate cutout valve 5 is closed, and the stopple machine 7 is removed from the intermediate cutout valve 5.

However, the conventional pipe interruption fitting 3, which is used for temporarily interrupting fluid flow in the pipe through the above-mentioned processes when pipe maintenance work is required, has the following problems.

(1) The lower end of the vertical pipe 1 of the pipe interruption fitting 3 must be cut into a shape corresponding to the curvature of the pipe 4. Therefore, a lot of time is required to shape the lower end of the vertical pipe 1 in the process of manufacturing the pipe interruption fitting 3. Furthermore, because the vertical pipe 1 of the pipe interruption fitting 3 is in edge contact with the pipe 4, load is concentrated on one part of the pipe 4, thereby it is difficult to conduct the welding work. As well, during use, there is a likelihood of cracks occurring at the junction of the vertical pipe 1 and the pipe 4, which are in edge contact with each other.

(2) Even after fluid flow in the pipe 4 has been interrupted using the pipe interruption fitting 3 and the pipe maintenance work has been completed, the intermediate cutout valve 5 must maintain the state of being coupled to the upper end of the pipe interruption fitting 3. The reason is that, because the pipe interruption fitting 3 is filled with gas after the work of boring the pipe 4 has been conducted, if the intermediate cutout valve 5 is removed, gas is discharged outside. Therefore, the expense of the pipe maintenance work increases due to the expensive intermediate cutout valve 5.

In an effort to overcome the above-mentioned problems with the pipe interruption fitting 3, another pipe interruption fitting, shown in FIG. 5, was proposed in Korean Utility Model Registration No. 0157683, which was registered on Jul. 3, 1999.

As shown in FIGS. 5 through 7, this pipe interruption fitting includes a vertical pipe 11, a flange 12, which is welded to an upper end of the vertical pipe 11, and a plug 13, which is screwed into an opening, which is formed at a central position in the flange 12. The pipe interruption fitting further includes a cover plate 14, which covers the flange 12 and the plug 13, and a reinforcing plate 15, which is welded to the lower end of the vertical pipe 11, and which has a circumferential inner surface having the same curvature as that of the circumferential outer surface of the pipe.

Furthermore, a sealing member 19 is interposed between the flange 12 and the plug 13, which is screwed into the flange 12, thus preventing fluid from leaking therebetween.

The flange 12 and the cover plate 14 are coupled to each other using bolts 17 and nuts 18. A gasket 20 is interposed between the flange 12 and the cover plate 14 to more reliably prevent fluid from leaking.

Furthermore, a lower reinforcing plate 16 is additionally provided to reinforce the pipe more reliably.

The method of using the pipe interruption fitting having the above-mentioned construction is presented below. The upper reinforcing plate 15 and the lower reinforcing plate 16 are respectively welded to an upper portion and a lower portion of the pipe at the position at which interruption of fluid flow is required. Here, because the reinforcing plates 15 and 16 contact a relatively large area of the pipe, preventing only a small part of the pipe from being affected by force, the process of welding the upper and lower reinforcing plates 15 and 16 to the pipe can be stably conducted, and the pipe interruption fitting can maintain a stable installation state after all processes have been completed. The lower reinforcing plate 16 supports the lower portion of the pipe 4, so that the pipe 4 is prevented from being bent by the weight of the intermediate cutout valve 5 and a boring machine 6.

In a state in which the plug 13 is removed, the intermediate cutout valve 15 is coupled to the flange 12, and the boring machine 6 is mounted to the upper end of the intermediate cutout valve 15.

The intermediate cutout valve 5 is thereafter opened, and a hole is bored through the pipe 4 using a boring tip 6a of the boring machine 6. After the hole has been bored, the cut part of the pipe and the boring tip 6a of the boring machine 6 are moved upwards. Thereafter, the intermediate cutout valve 5 is dosed, the boring machine 6 is removed, and a stopple machine 7 is mounted on the intermediate cutout valve 5.

Subsequently, the intermediate cutout valve 5 is again opened, and a stopple 7a of the stopple machine 7 is moved downwards to close the pipe 4, thus blocking fluid flow.

After the desired pipe maintenance work has been completed, the stopple 7a of the stopple machine 7 is moved upwards and the intermediate cutout valve 5 is closed. Thereafter, the stopple machine 7 is removed from the intermediate cutout valve 5.

Subsequently, a plug adaptor 6b is coupled to an end of a rod of the boring machine 6, and the plug 13 is fitted over the plug adaptor 6b. In this state, the boring machine 6 is mounted to the intermediate cutout valve 5. Thereafter, the intermediate cutout valve 5 is opened, and the plug 13 is screwed to the opening, which is formed at the central position in the flange 12. Because the sealing member 19 is fitted over the plug 13, the junction between the flange 12 and the plug 13 can be reliably sealed after the plug 13 has been assembled with the flange 12. Thereafter, the boring machine 6 and the intermediate cutout valve 5 are removed.

Finally, the cover plate 14 is coupled to the flange 12 using the bolts 17 and the nuts 18. Then the gasket 20 is interposed between the flange 12 and the cover plate 14. At this time, all of the processes have been completed.

However, in this pipe interruption fitting, there is a problem in that, because the flange 12 protrudes in a horizontal direction, when a process of covering the pipe interruption fitting using a patch or the like for heat insulation and corrosion resistance treatment is conducted, the flange 12 inconveniences a user. As well, when excavation work is conducted adjacent to the pipe interruption fitting, there is a probability of damaging the pipe interruption fitting due to an excavator catching the flange. Furthermore, because the plug 13 is screwed to the flange 12, there is a disadvantage in that the plug 13 must be rotated several times.

SUMMARY OF THE INVENTION

Accordingly, the present invention has been made keeping in mind the above problems occurring in the prior art, and an object of the present invention is to provide a pipe interruption fitting, which has a structure such that no part protrudes in a horizontal direction after pipe maintenance work has been completed, so that a process of covering the pipe interruption fitting using a heat insulating substance or a patch for heat insulation and corrosion resistance treatment can be conveniently conducted, and, even if excavation work is conducted adjacent to the pipe interruption fitting, the pipe interruption fitting is prevented from being caught and damaged by an excavator.

Another object of the present invention is to provide a pipe interruption fitting, in which a plug for preventing fluid from leaking can be easily and reliably installed in the pipe interruption fitting.

In order to accomplish the above object, the present invention provides a pipe interruption fitting including: an upper reinforcing plate, a circumferential inner surface of which has a curvature equal to a curvature of a circumferential outer surface of the pipe; and a vertical pipe, having a low height, welded to the upper reinforcing plate. The pipe interruption fitting further includes: an adaptor welded to an upper end of the vertical pipe and including an outer side surface having an inclined surface at a lower position thereof and having a vertical surface at an upper position thereof, with a plurality of bolt holes formed in an upper surface of the adaptor, a through hole formed through the adaptor and having an inner diameter equal to an inner diameter of the vertical pipe, and an annular groove formed in an inner surface of the through hole; a flange removably coupled to the upper surface of the adaptor by bolts fastened into the bolt holes of the adaptor, with a plurality of coupling holes formed in the flange so that a boring machine or a stopple machine is coupled to the flange through the coupling holes; a plug to be seated in the through hole of the adaptor and having an expansion plate to be inserted into the annular groove of the through hole of the adaptor, and a cover to be inserted into the through hole of the adaptor onto an upper end of the plug and to be welded to the adaptor.

Furthermore, the plug may include: an expansion plate having a circular shape, which is separable into two bodies and is provided with a central hole formed at a medial position of a cutting line through the expansion plate, the central hole being relatively short in a direction in which the expansion plate is expanded, and being relatively long in a direction perpendicular to the direction in which the expansion plate is expanded, with a plurality of slots formed in the expansion plate at symmetrical positions with respect to the cutting line, and pins provided on the expansion plate at symmetrical positions with respect to the cutting line; and a cylindrical body coupled to the expansion plate, with a plurality of threaded holes formed in an upper surface of the cylindrical body at positions corresponding to the slots of the expansion plate so that the expansion plate is coupled to the cylindrical body using bolts fastened into the threaded holes through the slot of the expansion plate, with an O-ring inserted into an annular groove formed in a circumferential outer surface of the cylindrical body, a circular hole vertically formed at a central position through the cylindrical body, and a check valve provided in the circular hole of the cylindrical body.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 1:
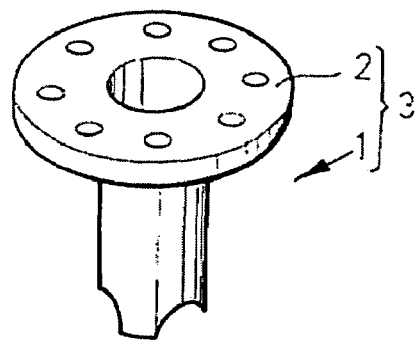
FIG. 1 is a perspective view showing a conventional pipe interruption fitting.
Figure 2:
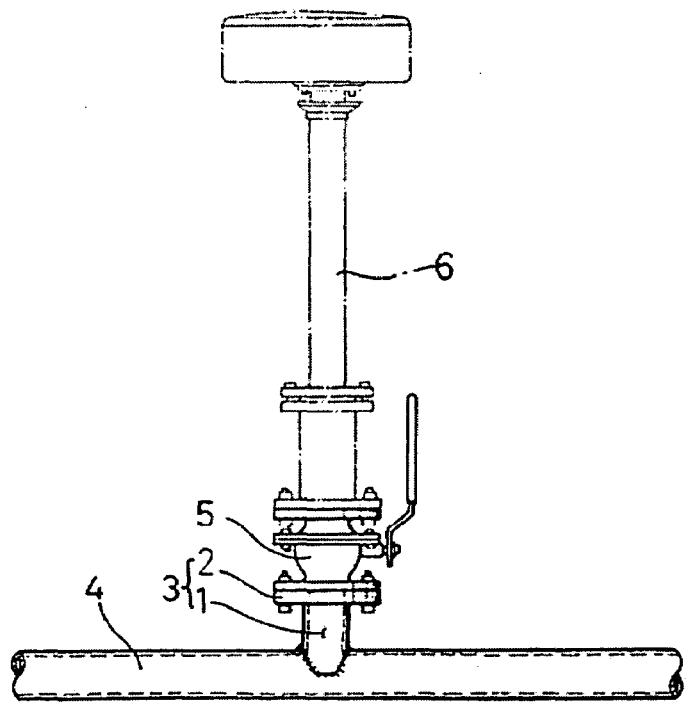
FIG. 2 is a view showing installation of an intermediate cutout valve and a boring machine, which are used for piping the pipe interruption fitting of FIG. 1.
Figure 3:
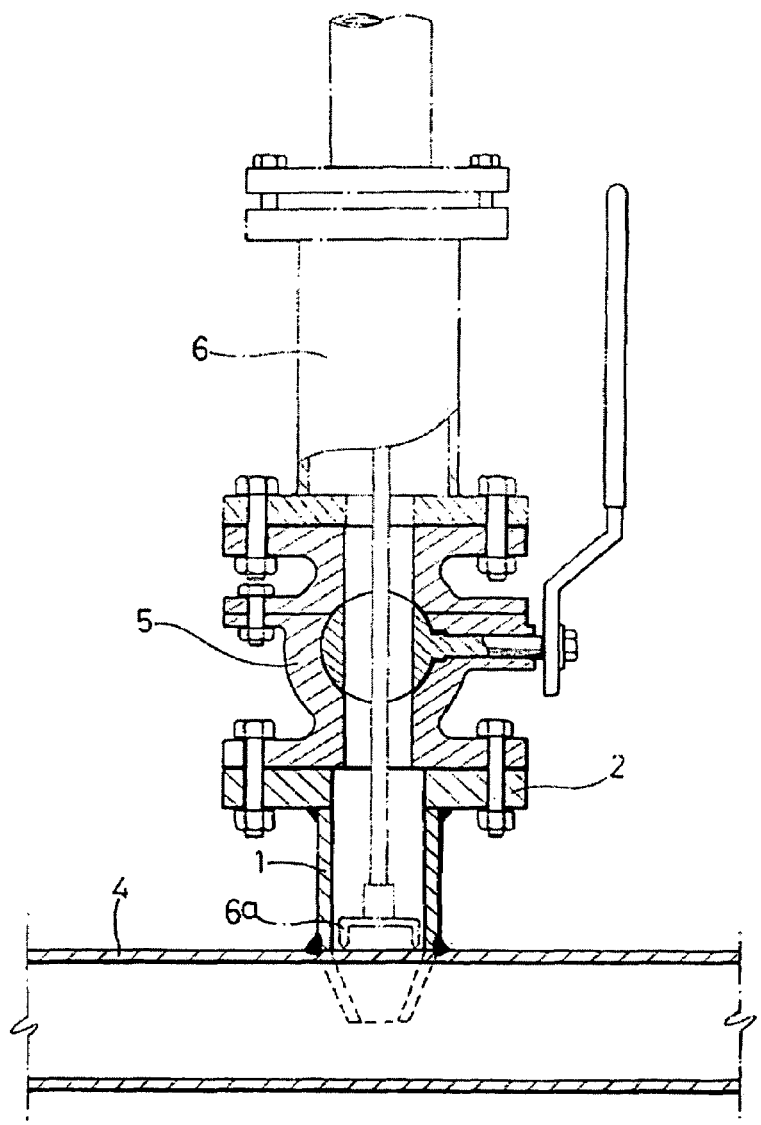
FIG. 3 is a sectional view showing a process of boring the pipe using the pipe interruption fitting of FIG. 1.
Figure 4:
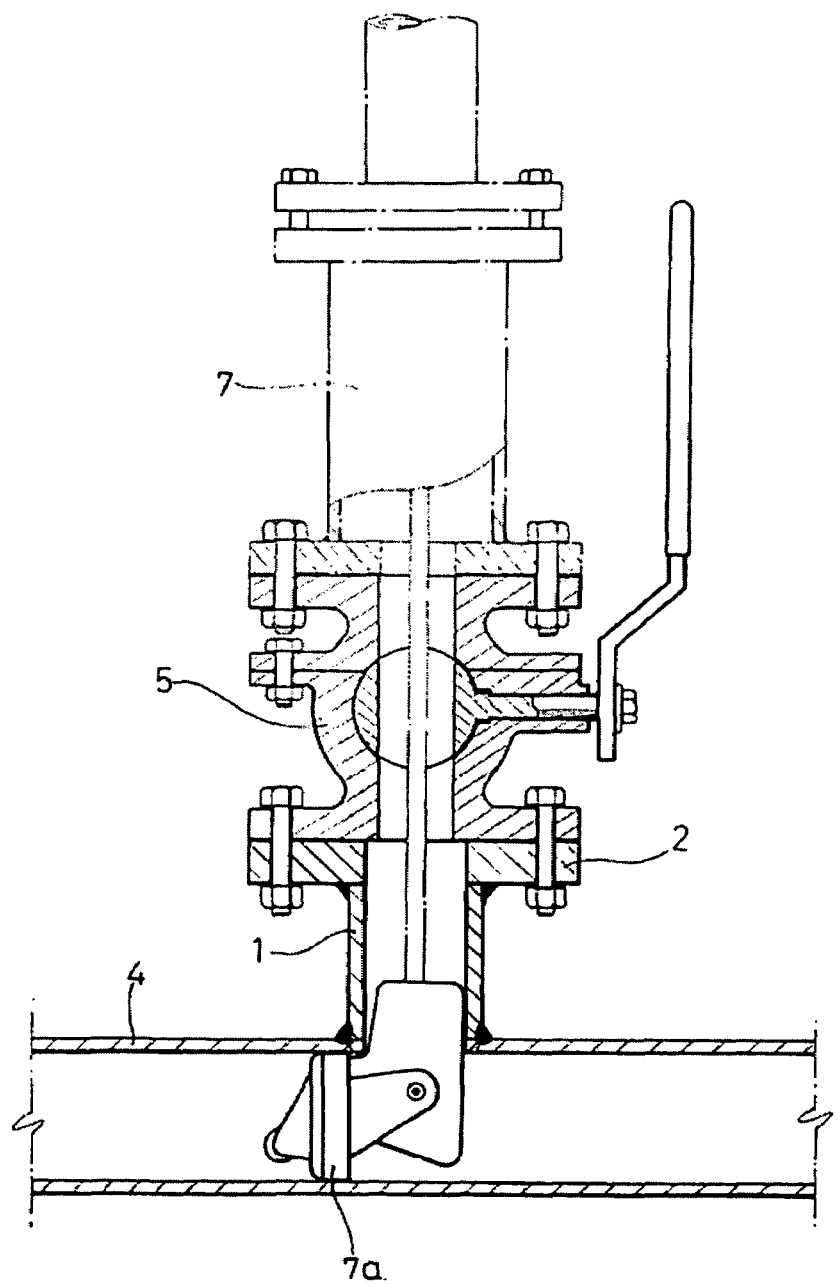
FIG. 4 is a partial view showing a process of interrupting fluid flow in the pipe using a stopple machine installed in the pipe interruption fitting of FIG. 1.
Figure 5:
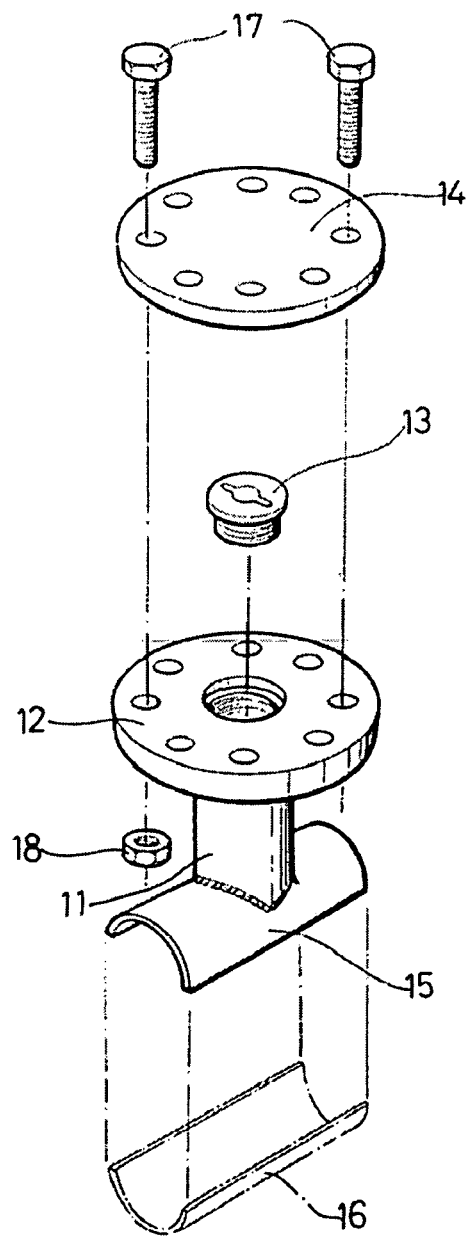
FIG. 5 is an exploded perspective view showing another conventional pipe interruption fitting.
Figure 6:
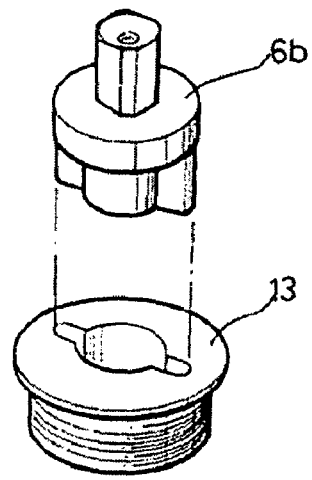
FIG. 6 is a perspective view of a plug adaptor of the pipe interruption fitting of FIG. 5 which is used for installation of a plug using a boring machine.
Figure 7:
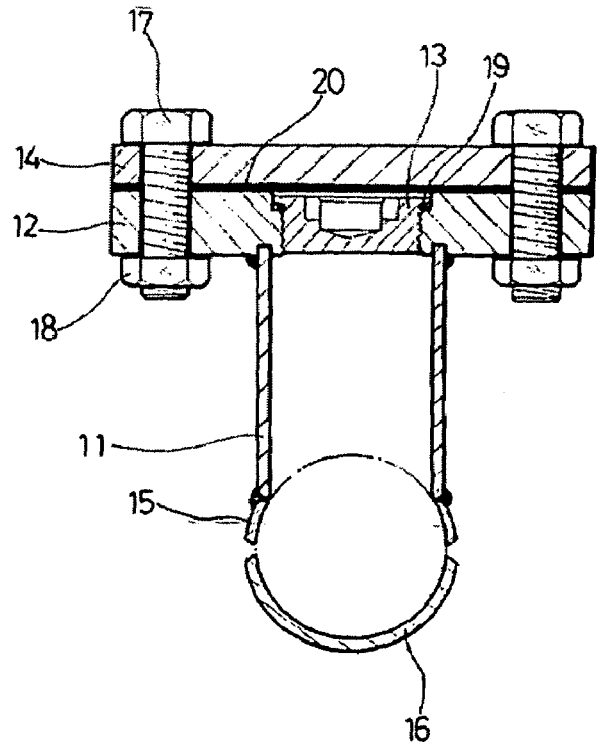
FIG. 7 is a sectional view showing installation of the pipe interruption fitting of FIG. 5.
Figure 8:
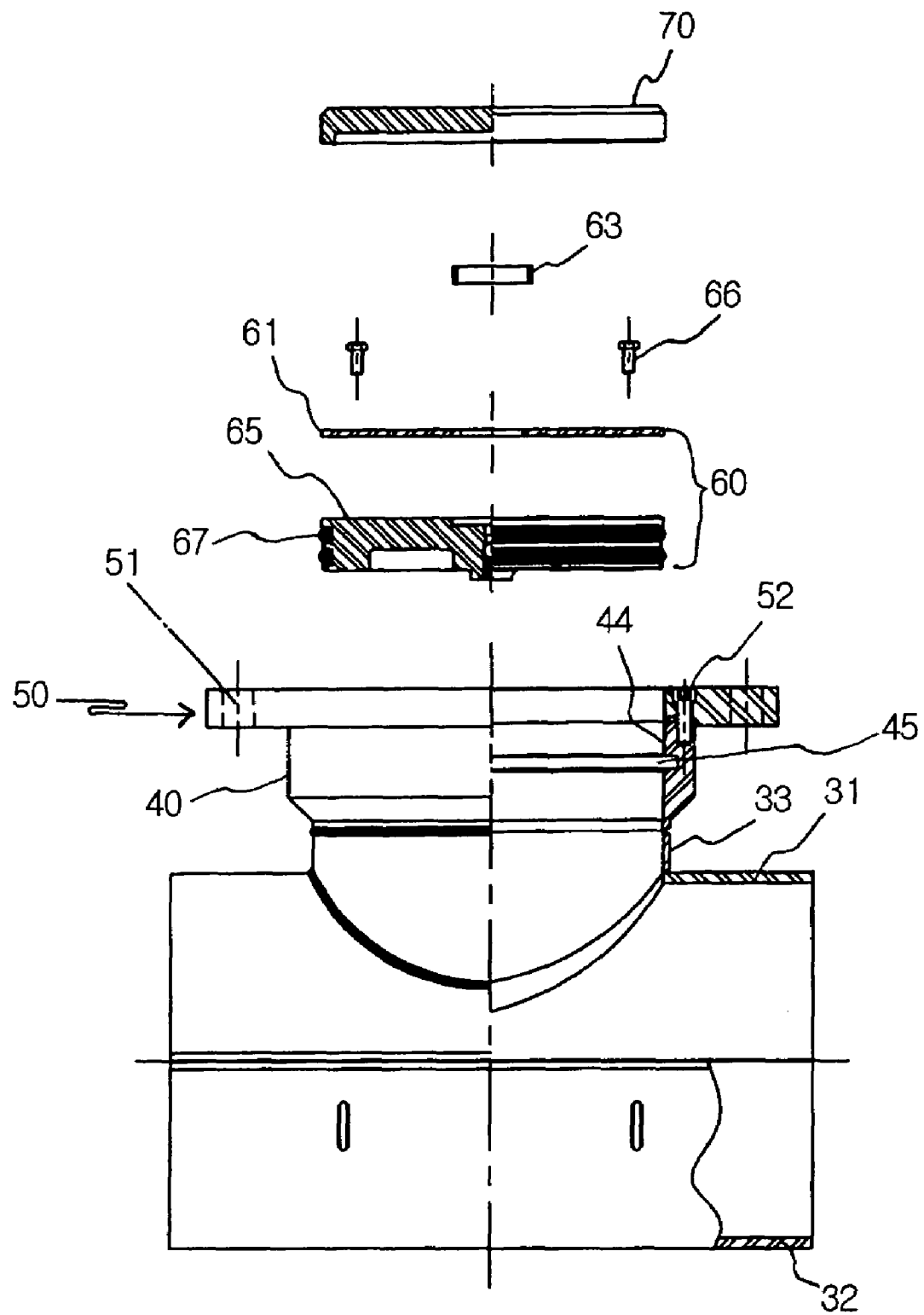
FIG. 8 is an exploded partial side sectional view of a pipe interruption fitting, according to an embodiment of the present invention.
Figure 9:
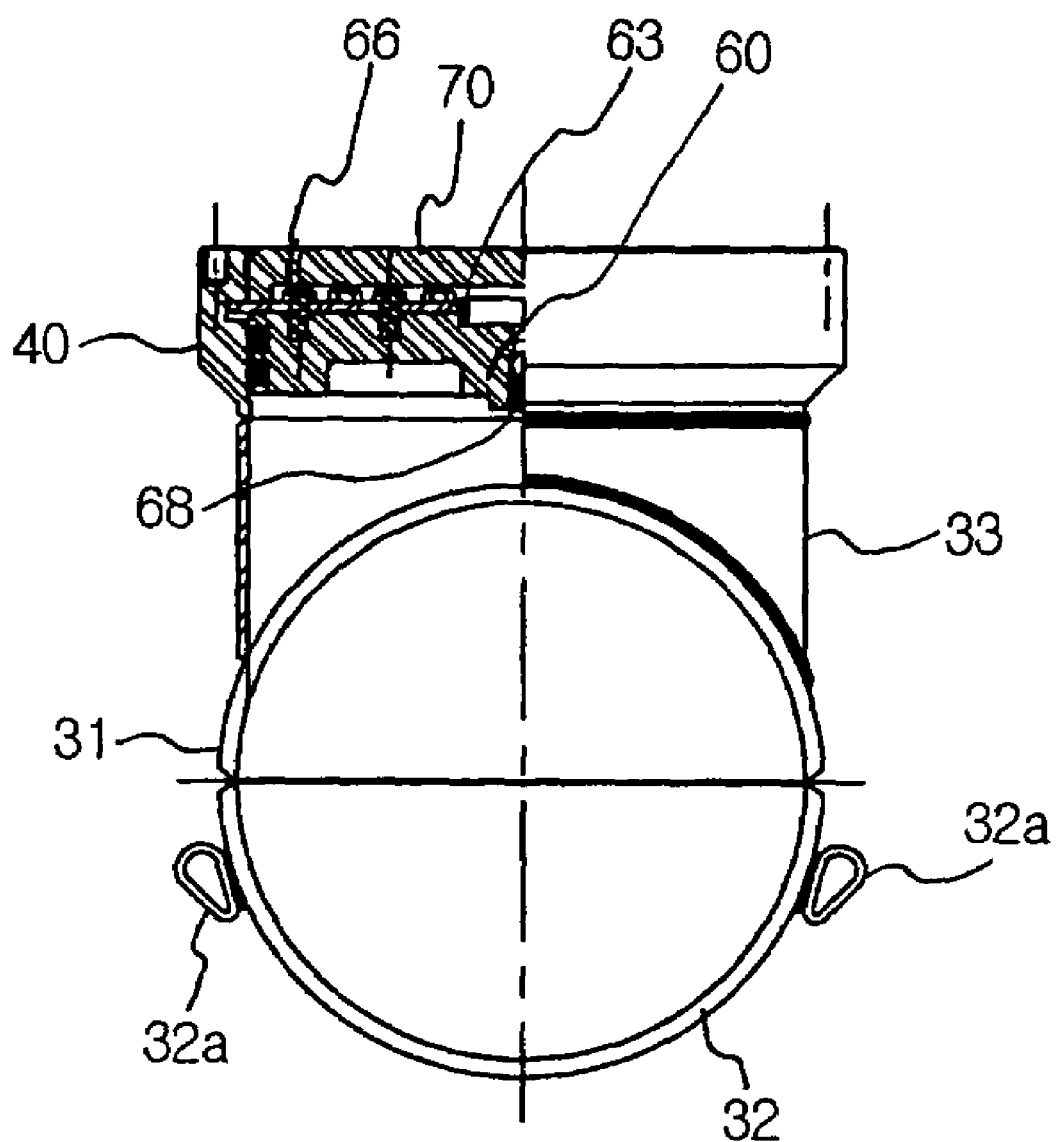
FIG. 9 is a partial front sectional view showing installation of the pipe interruption fitting according to the present invention.
Figure 10A:
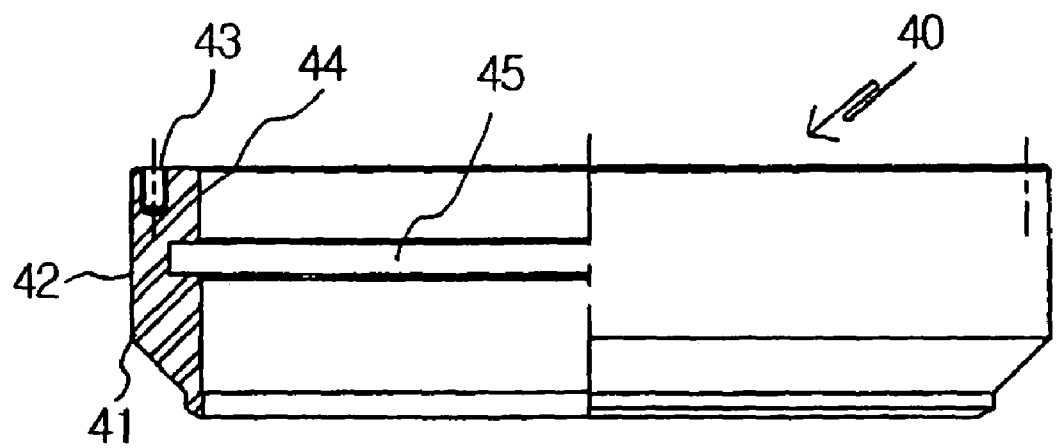
FIGS. 10a and 10b are, respectively, a partial side sectional view and a partial plan view showing an adaptor of the pipe interruption fitting according to the present invention.
Figure 10B:
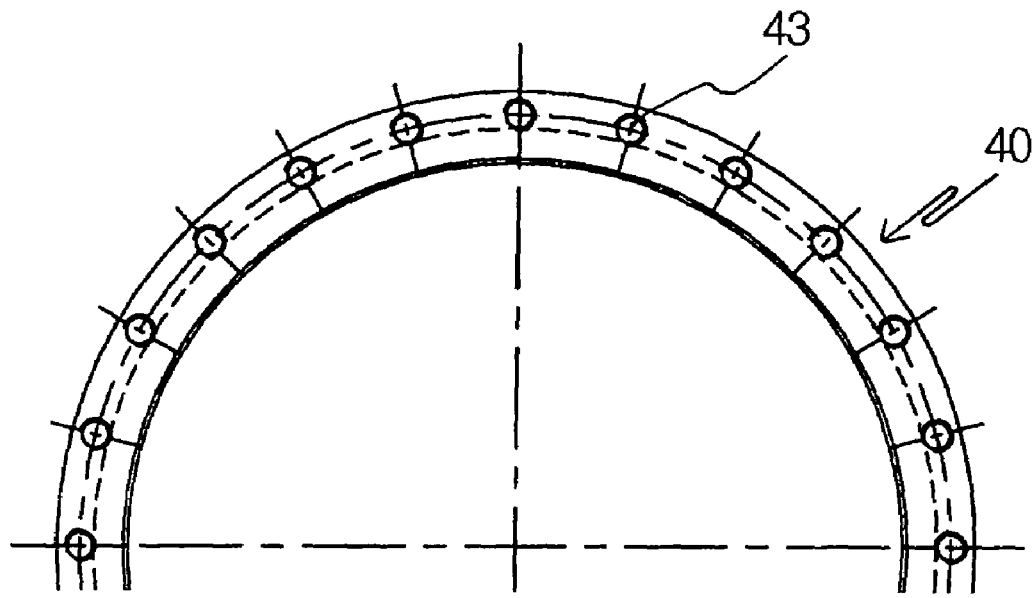
Figure 11A:
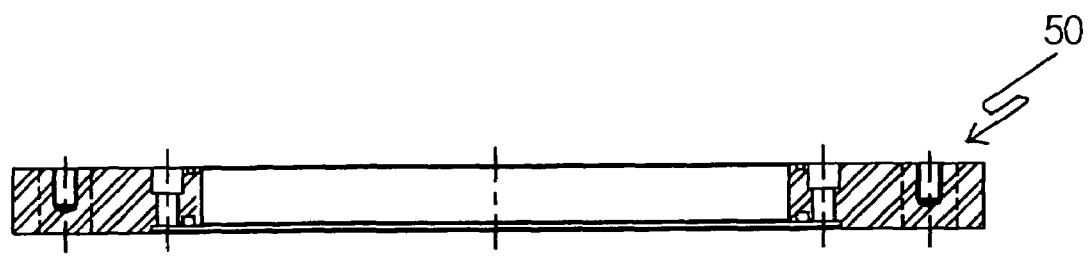
FIGS. 11a and 11b are, respectively, a sectional view and a partial plan view showing a flange of the pipe interruption fitting according to the present invention.
Figure 11B:
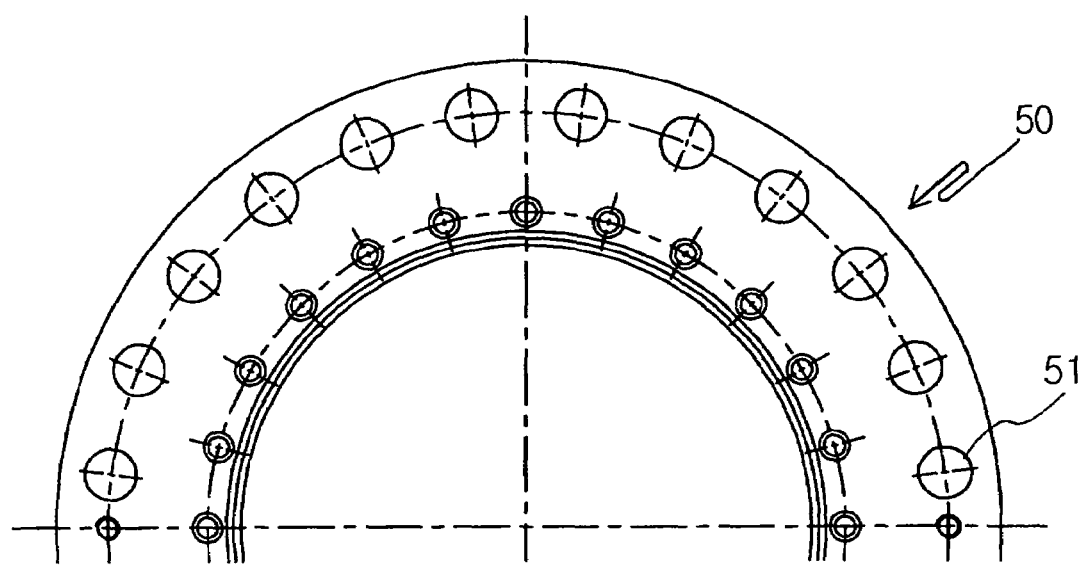

FIG. 8 is an exploded partial side sectional view of a pipe interruption fitting, according to an embodiment of the present invention. FIG. 9 is a partial front sectional view showing installation of the pipe interruption fitting of the present invention. FIGS. 10a and 10b are, respectively, a partial side sectional view and a partial plan view showing an adaptor 40 of the pipe interruption fitting of the present invention. FIGS. 11a and 11b are, respectively, a sectional view and a partial plan view showing a flange 50 of the pipe interruption fitting of the present invention.

As shown in the drawings, the pipe interruption fitting of the present invention includes an upper reinforcing plate 31, the circumferential inner surface of which has the same curvature as that of the circumferential outer surface of a pipe, and a vertical pipe 33, which is welded to the upper reinforcing plate 31 and has a relatively low height. The pipe interruption fitting further includes the adaptor 40, which is welded to the upper end of the vertical pipe 33, and an outer side surface of which includes an inclined surface 41 at a lower position and a vertical surface 42 at an upper position. A plurality of bolt holes 43 is formed in the upper surface of the adaptor 40. A through hole 44, which has the same inner diameter as that of the vertical pipe 33, is formed through the adaptor 40. An annular groove 45 is formed in the inner surface of the through hole 44. The pipe interruption fitting further includes the flange 50, which is removably coupled to the upper surface of the adaptor 40 by bolts 52 fastened into the bolt holes 43 of the adaptor 40 and has a plurality of coupling holes 51 for coupling a boring machine and a stopple machine thereto. The pipe interruption fitting further includes a plug 60, which is fitted into the through hole 44 of the adaptor 40 and has an expansion plate 61 to be inserted into the annular groove 45, and a cover 70, which is inserted into the upper end of the plug 60 and is welded to the adaptor 40.

To more reliably couple the fitting to the pipe, a lower reinforcing plate 32 as well as the upper reinforcing plate 31 may be welded to the pipe. To make the process of welding the lower reinforcing plate 32 to the pipe convenient, an assistant ring 32a is preferably provided on each of opposite sides of the lower reinforcing plate 32. In detail, a string is coupled to the assistant ring 32a, and the lower reinforcing plate 32 is lifted using the string while the welding process is conducted. Then, the welding process can be conducted more conveniently.

Figure 12A:
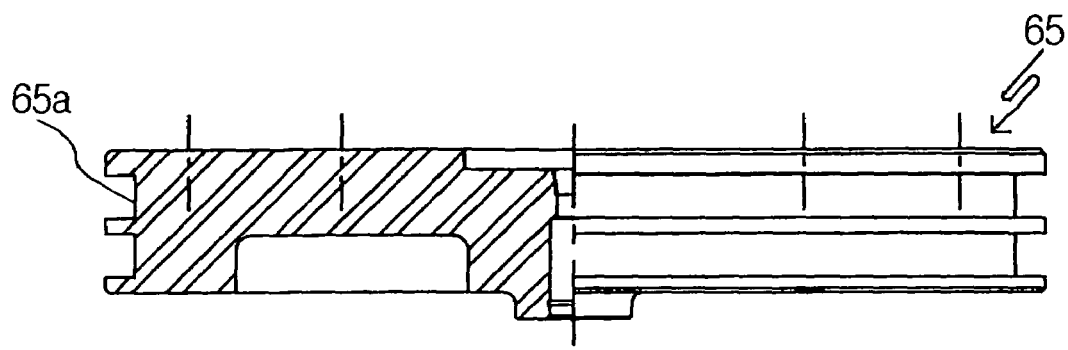
FIGS. 12a and 12b are, respectively, a partial side sectional view and a partial plan view showing a cylindrical body of a plug of the pipe interruption fitting according to the present invention.
Figure 12B:
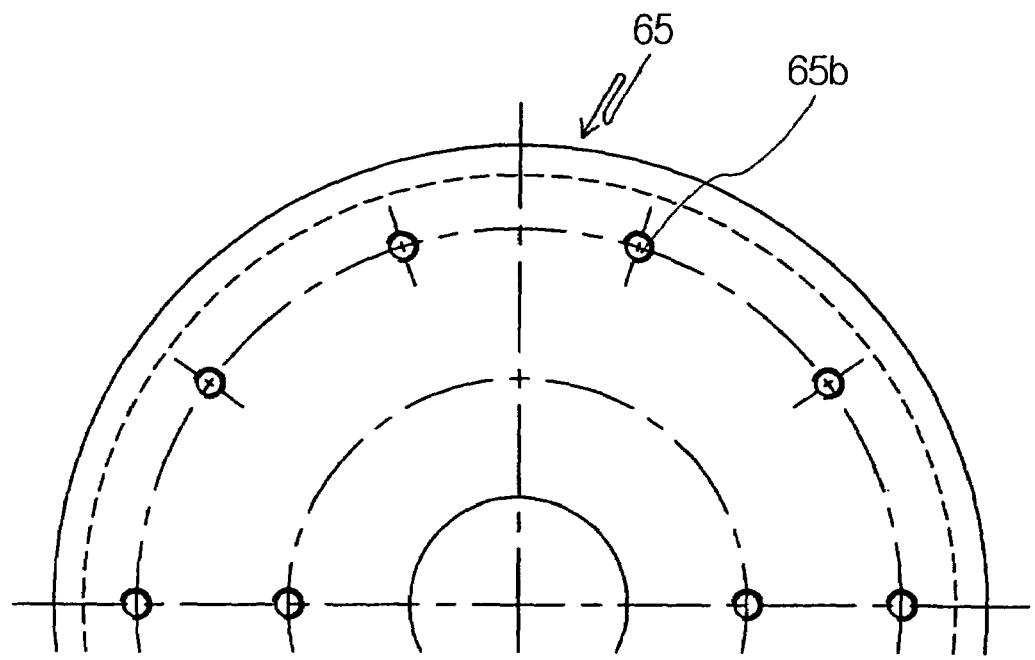
Figure 13:
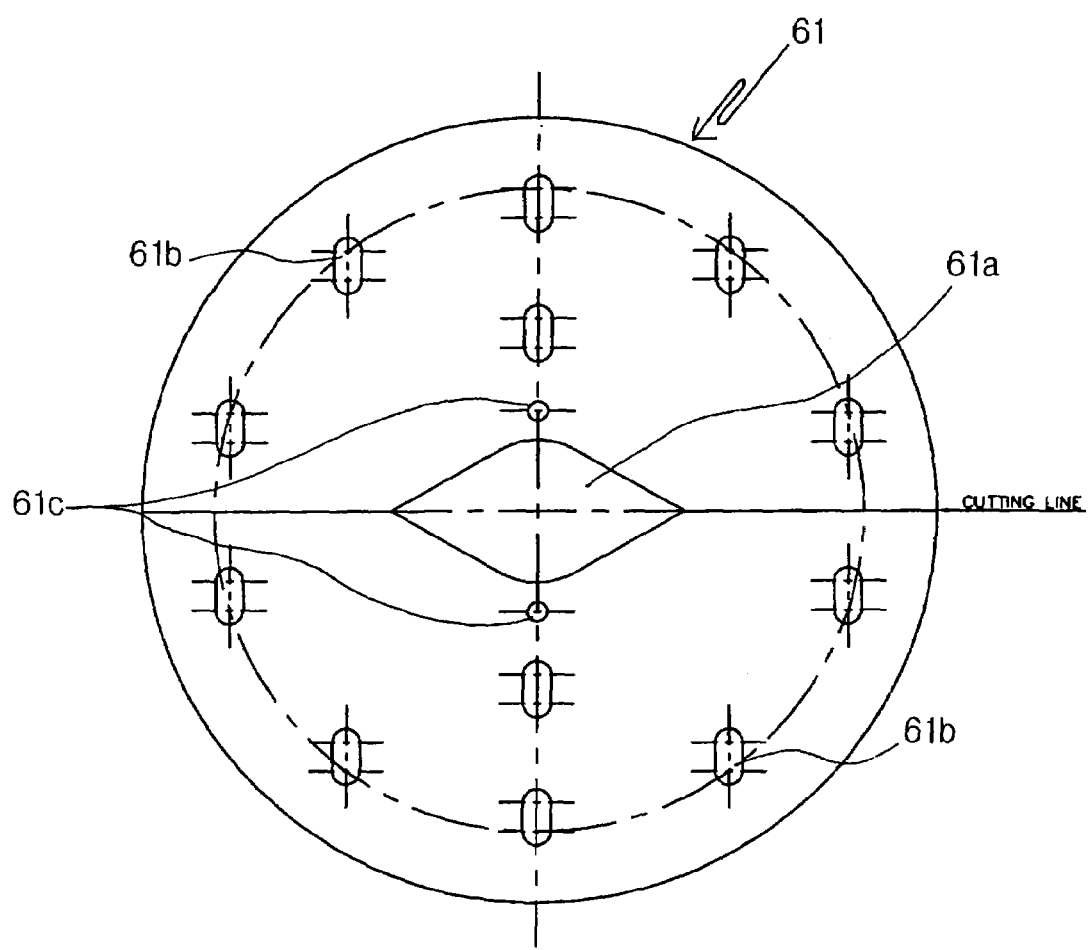
FIG. 13 is a plan view showing an expansion plate of the pipe interruption fitting according to the present invention.

The plug 60 will be explained in detail herein below. FIGS. 12a and 12b are, respectively, a partial side sectional view and a partial plan view showing a cylindrical body 65 of the plug 60 of the pipe interruption fitting of the present invention. FIG. 13 is a plan view showing an expansion plate 61 of the plug 60 of the pipe interruption fitting according to the present invention.

The plug 60 includes the expansion plate 61, which has a circular shape that is separable into two bodies and is provided with a central hole 61a, which is formed at a medial position of a cutting line through the expansion plate 61 and is relatively short in the direction in which the separated two bodies are moved, and is relatively long in a direction perpendicular to the direction in which the separated two bodies are moved. A plurality of slots 61b is formed in the expansion plate 61 at symmetrical positions with respect to the cutting line. Pins 61c are provided on the expansion plate 61 at symmetrical positions with respect to the cutting line. The plug 60 further includes the cylindrical body 65, which is coupled to the expansion plate 61 and has in an upper surface thereof a plurality of threaded holes 65b at positions corresponding to the slots 61b of the expansion plate 61 so that the expansion plate 61 is coupled to the cylindrical body 65 using bolts 66 fastened into the threaded holes 65b through the slot 61b of the expansion plate 61. An O-ring 67 is inserted into an annular groove 65a, which is formed in the circumferential outer surface of the cylindrical body 65. A circular hole is vertically formed at a central position through the cylindrical body 65. A check valve 68 (FIG. 9) is installed in the circular hole.

Before the two bodies of the expansion plate 61 are moved in directions away from each other, the bolts 66 are loosely fastened into the threaded holes 65b of the cylindrical body 65 such that the two bodies of the expansion plate 61 are movable. After the two bodies of the expansion plate 61 are moved in directions away from each other, the bolts 66 are securely fastened into the threaded holes 65b of the cylindrical body 65 such that the expansion plate 61 is securely coupled to the cylindrical body 65. The two bodies of the expansion plate 61 are movable only in the longitudinal direction of the slots 61b of the expansion plate 61 due to the slots 61b of the expansion plate 61 and the bolts 66 of the cylindrical body 65.

To insert the plug 60 into the through hole 44 of the adaptor 40, a particular kind of tool known as an expanding apparatus is required. The construction and usage of the expanding apparatus were explained in detail in Korean Patent Registration No. 473859, which was filed by the inventor of the present invention and registered on Feb. 18, 2005. Therefore, further explanation thereof will be omitted.

Figure 15A:
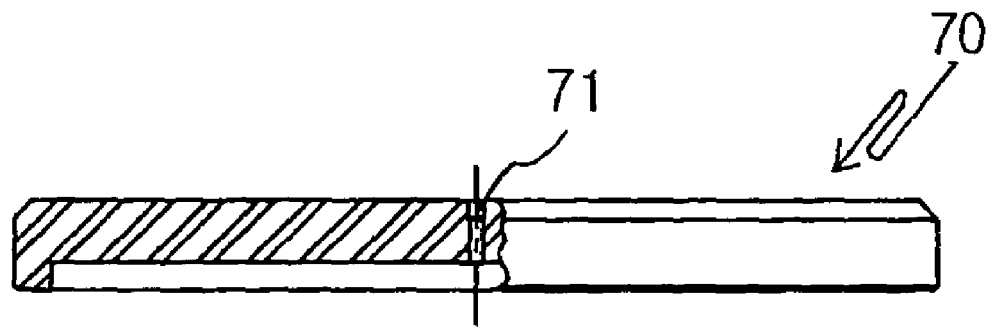
FIGS. 15a and 15b are, respectively, a partial side sectional view and a partial plan view showing a cover of the pipe interruption fitting according to the present invention.
Figure 15B:
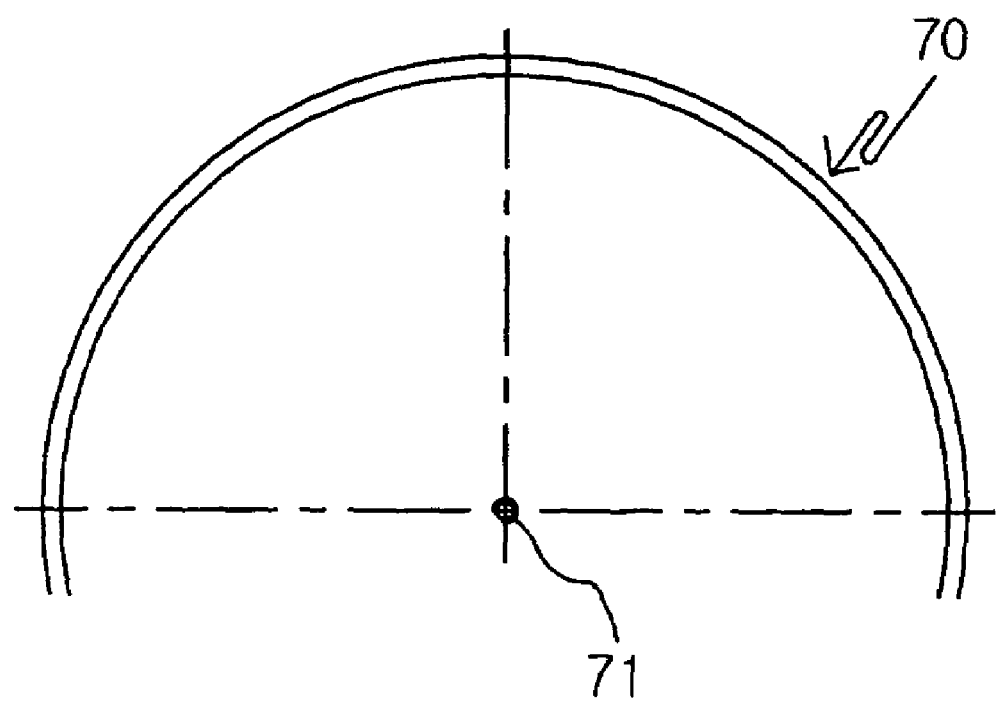

FIGS. 15a and 15b are, respectively, a partial side sectional view and a partial plan view showing the cover 70 of the pipe interruption fitting of the present invention.

The cover 70 is welded to the inner surface of the adaptor 40. Furthermore, a discharge hole 71 is formed at a central position through the cover 70 to prevent pressure in the adaptor 40 from excessively increasing due to high heat during the welding process. The discharge hole 71 is welded shut at the final stage.

The operation of the pipe interruption fitting of the present invention having the above-mentioned construction will be described herein below.

The upper reinforcing plate 31 and the lower reinforcing plate 32 are respectively welded to an upper portion and a lower portion of the pipe at the position at which interruption of fluid flow is required. Here, because the upper and lower reinforcing plates 31 and 32 contact a relatively large area of the pipe to prevent only a small part of the pipe from being affected by force, the process of welding the upper and lower reinforcing plates 31 and 32 to the pipe can be stably conducted, and the pipe interruption fitting can maintain a stable installation state after all processes have been completed.

Thereafter, the flange 50 is coupled to the vertical pipe 33 using the bolts 52. In the same manner as in the conventional art, an intermediate cutout valve is coupled to the flange 50 using the coupling holes 51, and a boring machine is mounted to the upper end of the intermediate cutout valve.

The intermediate cutout valve is thereafter opened, and a hole is bored in the pipe using a boring tip of the boring machine. After the hole has been bored, a cut part of the pipe and the boring tip of the boring machine are moved upwards. Thereafter, the intermediate cutout valve is closed, the boring machine is removed, and a stopple machine is mounted on the intermediate cutout valve.

Subsequently, the intermediate cutout valve is again opened, and a stopple of the stopple machine is moved downwards to close the pipe, thus blocking fluid flow.

After fluid flow has been blocked by the above-mentioned method at an upstream position and a downstream position of a maintenance requiring portion of the pipe, desired maintenance work, such as replacement of part of the pipe, is conducted.

After the pipe maintenance work has been completed, the stopple of the stopple machine is moved upwards and the intermediate cutout valve is closed. Thereafter, the stopple machine is removed from the intermediate cutout valve.

Figure 14:
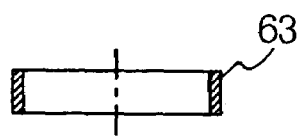
FIG. 14 is a sectional view showing a ring of the pipe interruption fitting according to the present invention.

Subsequently, the plug 60 is inserted into the through hole 44 of the adaptor 40. Here, the expansion plate 61 is expanded using the expanding apparatus, which is a particular tool, such that an outer edge of the expansion plate 61 is inserted into the annular groove 45 of the adaptor 40. In this state, a ring 63 of FIG. 14 is placed in the central hole 61a of the expansion plate 61 to prevent the expansion plate 61 from returning to the original state thereof. Because the O-ring 67 is interposed between the plug 60 and the adaptor 40, the pipe is airtightly sealed without leakage of fluid such as gas. The check valve 68, which is installed at the center of the cylindrical body 65, allows fluid to enter the pipe through the plug 60 when pressure above the plug 60 is higher than the inside of the pipe, but prevents fluid in the pipe from being discharged outside the pipe through the plug 60 during processes such as welding and installation of the boring machine and a plugging machine.

After the installation of the plug 60 has been completed, the plugging machine is removed, and the flange 50 is separated from the adaptor 40 by loosening the bolts 52. Thereafter, the cover 70 is inserted into and welded to the upper end of the through hole 44 of the adaptor 40. Subsequently, the pipe interruption fitting is processed by heat insulation treatment and corrosion resistance treatment.

Here, because the remaining part of the pipe interruption fitting has no part which protrudes in a horizontal direction, that is, has no flange, residual work can be conveniently conducted. After the above-mentioned processes have been completed, the pipe interruption fitting is covered with fill.

As such, the present invention has no part which protrudes in a horizontal direction and, as well, the lower portion of the outer surface of the adaptor 40 is formed to have an inclined surface 41. Thus, during other work, the likelihood of the pipe interruption fitting being caught by equipment such as an excavator is reduced. Therefore, the present invention can maintain a stable installation state.

As described above, the present invention provides a pipe interruption fitting which has a structure such that no part protrudes in a horizontal direction after pipe maintenance work has been completed, so that a process of covering the pipe interruption fitting using a heat insulating substance or a patch for heat insulation and corrosion resistance treatment can be conveniently conducted. Furthermore, even if excavation work is conducted adjacent to the pipe interruption fitting, the likelihood of the pipe interruption fitting being damaged by an excavator is reduced. As well, the present invention has an advantage in that a plug, which prevents fluid from leaking, can be easily and reliably installed in the pipe interruption fitting.

Although the preferred embodiment of the present invention has been disclosed for illustrative purposes, the present invention is not limited to the preferred embodiment. Furthermore, those skilled in the art will appreciate that various modifications, additions and substitutions are possible, without departing from the scope and spirit of the invention as disclosed in the accompanying claims.

Therefore, such modifications, additions and substitutions must be regarded as falling within the scope of the present invention.

What is claimed is:

1. A pipe interruption fitting used for interrupting fluid flow in a pipe for conducting pipe maintenance work, comprising:
   an upper reinforcing plate having a circumferential inner surface with a curvature adapted to a curvature of a circumferential outer surface of the pipe;
   a short vertical pipe welded to said upper reinforcing plate;
   an adaptor welded to an end of said vertical pipe remote from said upper reinforcing plate and including an outer side surface having an inclined surface at a position closer to said vertical pipe and having a vertical surface at a position remote from said vertical pipe, wherein said adaptor has a plurality of bolt holes formed in an upper surface thereof remote from said vertical pipe, a through hole having an inner diameter equal to an inner diameter of said vertical pipe, and an annular groove formed in an inner surface of said through hole;
   a flange removably coupled to the upper surface of said adaptor by bolts fastened into said bolt holes of said adaptor, wherein a plurality of coupling holes are formed in said flange so that a boring machine or a stopple machine can be coupled to said flange;
   a plug adapted to be seated in said through hole of said adaptor and including an expansion plate adapted to be inserted into said annular groove of said through hole of said adaptor, and
   a cover adapted to be inserted into said through hole of said adaptor onto an end of said plug remote from said upper reinforcing plate, wherein said cover is adapted to be welded to said adaptor.

2. The pipe interruption fitting according to claim 1, wherein said plug comprises:
   an expansion plate having a circular shape, wherein said expansion plate is separable into two bodies and is provided with a central hole formed at a medial position of a cutting line through said expansion plate, wherein said central hole is relatively short in a direction in which said expansion plate is adapted to be expanded and is relatively long in a direction perpendicular to the direction in which said expansion plate is adapted to be expanded, wherein a plurality of slots are formed in said expansion plate at symmetrical positions with respect to the cutting line, and wherein pins are provided on said expansion plate at symmetrical positions with respect to the cutting line; and
   a cylindrical body coupled to said expansion plate, wherein a plurality of threaded holes are formed in an upper surface of said cylindrical body at positions corresponding to said slots of said expansion plate, wherein said expansion plate is coupled to said cylindrical body using bolts fastened into said threaded holes through said slots of said expansion plate, wherein an O-ring is inserted into an annular groove formed in a circumferential outer surface of said cylindrical body, wherein a circular hole is vertically formed at a central position through said cylindrical body, and wherein a check valve is provided in the circular hole of said cylindrical body.

* * * * *